(12) United States Patent
Okawa et al.

(10) Patent No.: US 11,903,367 B2
(45) Date of Patent: Feb. 20, 2024

(54) URINE EXAMINATION CONTAINER AND URINE EXAMINATION KIT

(71) Applicant: Unicharm Corporation, Shikokuchuo (JP)

(72) Inventors: Ayano Okawa, Kanonji (JP); Yasuhiro Sasano, Kanonji (JP); Kengo Onishi, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 714 days.

(21) Appl. No.: 16/996,339

(22) Filed: Aug. 18, 2020

(65) Prior Publication Data

US 2021/0068372 A1    Mar. 11, 2021

(30) Foreign Application Priority Data

Sep. 6, 2019    (JP) .................................. 2019-163380

(51) Int. Cl.
*A01K 29/00* (2006.01)
*A01K 1/01* (2006.01)
*A61D 99/00* (2006.01)

(52) U.S. Cl.
CPC ............ *A01K 29/005* (2013.01); *A01K 1/011* (2013.01); *A61D 99/00* (2013.01)

(58) Field of Classification Search
CPC .... A01K 1/0107; A01K 1/011; A01K 1/0114; A01K 1/0125; A01K 23/005; A61D 99/00
USPC ........................................................ 119/169
See application file for complete search history.

(56) References Cited

U.S. PATENT DOCUMENTS

| | | | | |
|---|---|---|---|---|
| 2,733,684 A | * | 2/1956 | Trenchard ............ | A01K 1/0103 119/869 |
| 4,444,148 A | * | 4/1984 | Lander ................. | A01K 1/0107 4/300.3 |
| 4,840,140 A | * | 6/1989 | Yananton ............. | A01K 1/0107 119/169 |
| 5,211,133 A | * | 5/1993 | Foley ................... | A01K 1/0114 119/165 |
| 5,353,743 A | * | 10/1994 | Walton ................. | A01K 23/005 119/165 |
| 5,359,960 A | * | 11/1994 | Yananton ............. | A01K 1/0154 119/165 |

(Continued)

FOREIGN PATENT DOCUMENTS

| | | |
|---|---|---|
| JP | 04104569 U | 9/1992 |
| JP | 10084805 A | 4/1998 |

(Continued)

OTHER PUBLICATIONS

English Abstract and Machine Translation for Japanese Publication No. 5433319 B2, published Dec. 13, 2013, 19 pgs.

(Continued)

*Primary Examiner* — Yvonne R Abbott-Lewis
(74) *Attorney, Agent, or Firm* — Fredrikson & Bryon, P.A.

(57) ABSTRACT

The urine examination container (1) includes a bottom portion (2), a peripheral wall portion (3) that extends upward from an outer peripheral edge (6) of the bottom portion (2), surrounds the periphery of the bottom portion (2), and defines a urine receiving portion (5) that opens upward together with the bottom portion (2), and a grip portion (4) that projects outward from the peripheral wall portion (3).

12 Claims, 9 Drawing Sheets

(56) References Cited

U.S. PATENT DOCUMENTS

| | | | |
|---|---|---|---|
| 5,360,013 A | | 11/1994 | Gilbert |
| 5,517,947 A | * | 5/1996 | Christman ........... A01K 1/0114 209/373 |
| 5,893,336 A | * | 4/1999 | Vice ..................... A01K 1/0114 119/166 |
| 6,089,188 A | | 7/2000 | Corley |
| 10,111,403 B2 | * | 10/2018 | Sareyani .............. A01K 1/0125 |
| 11,000,007 B2 | * | 5/2021 | Ward ................... A01K 1/0107 |
| 11,206,806 B2 | * | 12/2021 | Van Wert ............. A01K 1/0114 |

FOREIGN PATENT DOCUMENTS

| | | |
|---|---|---|
| JP | 2007174943 A | 7/2007 |
| JP | 5433319 B2 | 12/2013 |
| JP | 2015123078 A | 7/2015 |
| JP | 2019083701 A | 6/2019 |
| WO | 2018016684 A1 | 1/2018 |

OTHER PUBLICATIONS

Extended European Search Report for European Patent Application No. 20190575.9, dated Feb. 8, 2021, 8 pgs.

Notice of Reasons for Rejection mailed by Japan Patent Office (JPO) for corresponding Application No. JP2019-163380, dated Jun. 13, 2023, with English translation, 12 pages.

\* cited by examiner

URINE EXAMINATION CONTAINER AND URINE EXAMINATION KIT

BACKGROUND OF THE INVENTION

Field of the Invention

The present invention relates to a urine examination container for pets and a urine examination kit.

Priority is claimed on Japanese Patent Application No. 2019-163380, filed on Sep. 6, 2019, the content of which is incorporated herein by reference.

Description of Related Art

In the related art, it has been encouraged to check a pet's urine in order to manage the pet's health. Examples of a method of checking urine of a pet include a visual examination, a urine test paper examination, a detailed examination, and the like.

The visual examination is a method of visually observing the color or turbidity of collected urine. The urine test paper examination is a method of determining the health condition of a pet by soaking collected urine in a test paper and observing discoloration of the test paper. The detailed examination is a method of conducting a detailed examination at a facility such as a hospital based on urine collected by an owner.

It is known that the visual examination and the urine test paper examination can be performed by the owner himself/herself at home or the like, and this alone is effective for understanding the health condition of a pet.

As a method of collecting a pet's urine at home, a method of an owner directly scooping urine with a dipper or a ladle during excretion of the pet and transferring it to an examination container is generally known. In addition to this, there is known a method of transferring the urine collected in a tray of a pet toilet that is normally used for an examination container. As the tray for the purpose of transferring the urine collected in the tray to the examination container without spilling thereof, a configuration disclosed in Japanese Patent No. 5433319 is known, for example.

In a case of requesting a detailed examination from a hospital or the like, it is required to transfer urine collected at home and the like, for example, to an examination container or the like and carry it to the hospital. In addition, there is also a case where a method of directly collecting urine from the bladder by bladder puncture is adopted in the hospital.

SUMMARY OF THE INVENTION

However, among the above-described methods of collecting urine, by the method of the owner directly collecting urine used for urine examination, it is not possible to collect fresh urine unless the owner is present at the moment of excretion of the pet. Therefore, collecting urine took a lot of time and labor, and thus imposed a heavy burden on the owner. In addition, the pet was stressed since the owner was nearby during excretion.

Among the methods of collecting urine described above, in the method of transferring urine collected in the tray, since the urine is directly stored in the tray, it is required to wash or wipe the tray after collecting urine, and hygienically using the tray required a lot of effort. In addition, if the tray is not sufficiently washed or wiped with water and the urine that has been excreted for hours remains in the tray, there is a possibility that an accurate urine examination cannot be performed.

Among the above-described methods of collecting urine, the method of collecting urine directly from the bladder by bladder puncture can collect urine in an aseptic state, but there was a possibility that the pet was physically stressed.

Therefore, the present invention has been made in view of the above circumstances, and provides a urine examination container and a urine examination kit that can easily collect urine for urine examination, can be hygienically used, and can collect urine without imposing stress on both the owner and the pet.

In order to achieve the above object, the present invention includes the following aspects.

(1) A urine examination container according to an aspect of the present invention is a urine examination container used in an animal toilet including an upper container in which a plurality of holes is formed, and a tray for receiving and storing urine that drops from the holes of the upper container, the container including a bottom portion; a peripheral wall portion that extends upward from an outer peripheral edge of the bottom portion, surrounds a periphery of the bottom portion, and defines a urine receiving portion that opens upward together with the bottom portion; and a grip portion that projects outward from the peripheral wall portion, in which an angle between the bottom portion and the peripheral wall portion is formed as an obtuse angle.

According to the present aspect, since the peripheral wall portion is formed an obtuse angle, in a case where urine adheres to an inner surface of the peripheral wall portion, urine flows along the inner surface of the peripheral wall portion to the bottom portion. With this, urine can be easily collected for urine examination. In addition, by gripping two facing locations of the grip portion formed so as to project outward from an upper end portion of the peripheral wall portion, it is possible to easily transport the urine examination container and to hygienically treat the urine examination container. In addition, according to the present aspect, a test paper is pressed against the peripheral wall portion that is inclined at an obtuse angle with respect to the bottom portion and pulled upward, so that the excess urine adhered to the test paper is rubbed against the peripheral wall portion. With this, it is possible to take out a test paper after removing the excess urine adhered to the test paper. Furthermore, according to the present aspect, the owner can conveniently collect the urine stored in the urine examination container. For this reason, the owner can collect the urine of the pet without having to be present at the moment of excretion of the pet, and thus the time and labor required for the owner to collect the urine can be reduced. In addition, since the owner is not present at the moment of excretion of the pet, the pet can urinate without being stressed, and the owner can collect the urine.

(2) The urine examination container according to (1), in which a groove portion may be formed on an upper surface of the bottom portion.

According to the present aspect, it is possible to store urine locally in the groove portion of the bottom portion. For this reason, even in a case where the urine per time is small, it becomes easy to ensure a certain amount of urine for dipping the test paper.

(3) In the urine examination container according to (2), the groove portion may be formed in an outer peripheral portion of the upper surface of the bottom portion.

According to the present aspect, in a case where the urine examination container is integrally formed by press molding, for example, since a bent portion between the peripheral wall portion and the bottom portion becomes a part of the groove portion, complication of the mold due to the addition of the groove portion can be suppressed. In addition, according to the present aspect, since the groove portion functions as a bead on the bottom portion, the strength of the urine examination container itself can be increased without increasing a thickness of the bottom portion. In addition, according to the present aspect, in a case where a part of the grip portion of the urine examination container is gripped by hand and lifted, and the urine examination container is tilted, the urine in the groove portion of the outer peripheral portion located opposite to the portion gripped by the hand is easily accumulated. For this reason, the urine adhered to the test paper is easily gathered, and it becomes easier to collect the urine. In addition, according to the present embodiment, since the distortion of the urine examination container can be suppressed, the urine examination container can be stably installed.

(4) In the urine examination container according to (2) or (3), a plurality of the groove portions may be formed on the upper surface of the bottom portion.

According to the present aspect, the groove portions that function as beads at the bottom portion are increased, and therefore the strength of the urine examination container itself can be further increased without increasing the thickness of the bottom portion.

(5) In the urine examination container according to any one of (1) to (4), at least a part of an upper surface of the bottom portion may be black.

According to the present aspect, it becomes easy to check the presence of crystals in urine with the black portion as a background.

(6) In the urine examination container according to (5), at least a part of an outer peripheral portion of the upper surface of the bottom portion may be black.

According to the present aspect, it is easy to check the presence of crystals in urine accumulated in the outer peripheral portion with the black portion as the background.

(7) The urine examination container according to any one of (1) to (6) may further have a display portion indicating a urine examination evaluation reference on a surface of the urine examination container.

According to the present aspect, for example, since it is not required to compare the evaluation reference described on the package with the test paper and the urine and the evaluation reference can be visually checked, evaluation becomes easy.

(8) In the urine examination container according to any one of (1) to (7), at least any one of the bottom portion, the peripheral wall portion, and the grip portion may include a display portion indicating a urine examination evaluation reference on a surface facing upward.

According to the present aspect, it is not required to compare the evaluation reference described on the package with the test paper, and since the urine and the evaluation reference can be visually checked at once, the evaluation becomes easy.

(9) The urine examination container according to (8), in which the display portion may be provided on the surface facing upward of the grip portion or the peripheral wall portion.

According to the present aspect, it is easy to arrange the display portion at a position where it is hardly likely to be soaked in the urine, of the urine examination container, and even in a state where the urine is housed in a urine receiving portion, it is easy to compare the collected urine with the evaluation reference of the display portion, and thus the evaluation can be easy.

(10) In the urine examination container according to any one of (1) to (9), the grip portion may project from the peripheral wall portion by 3 mm or more.

According to the present aspect, it is possible to easily pick up the urine examination container with a finger and improve the handleability.

(11) In the urine examination container according to any one of (1) to (10), the grip portion may extend downward as it goes outward.

According to the present aspect, by overlapping a grip portion of one urine examination container with a grip portion of another urine examination container, the grip portions are hooked to each other in a direction orthogonal to a vertical direction. For this reason, a connection portion formed by overlapping the grip portions of two or more adjacent urine examination containers becomes hard to come off. In addition, according to the present aspect, in a case where the urine examination container is carried around, it becomes easy to hook a finger or hand on a lower surface of the grip portion and a tip of the grip portion, and thus the urine examination container can be lifted more easily and the handleability is improved.

(12) In the urine examination container according to any one of (1) to (11), an outer shape in a plan view of the peripheral wall portion is polygonal, and a corner portion forming a polygonal shape of the peripheral wall portion may have a rib extending in a vertical direction on an inner surface of the corner portion.

According to the present aspect, by expanding the rib formed at the corner portion, it is possible to flatten the urine examination container. Since the flattened urine examination container can be rolled into a tubular shape, a volume at the time of discarding can be reduced. In addition, according to the present embodiment, since the outer shape in a plan view is polygonal, urine can easily flow from the corners.

(13) A urine examination kit according to another aspect of the present invention includes the urine examination container according to any one of (1) to (12) and a test paper.

According to the present aspect, it is possible to easily perform the urine examination using the test paper with the urine collected in the urine examination container.

(14) The urine examination kit according to (13) may further include a urine collection container.

According to the present aspect, the urine collected in the urine examination container can be housed in the urine collection container, and the urine can be brought to a hospital or the like.

According to the urine examination container of the aspect, it is possible to provide a urine examination container and a urine examination kit that can easily collect urine for urine examination, can be used hygienically, and further, can collect urine without imposing stress on both the owner and the pet.

DETAILED DESCRIPTION OF THE INVENTION

Figure 1:
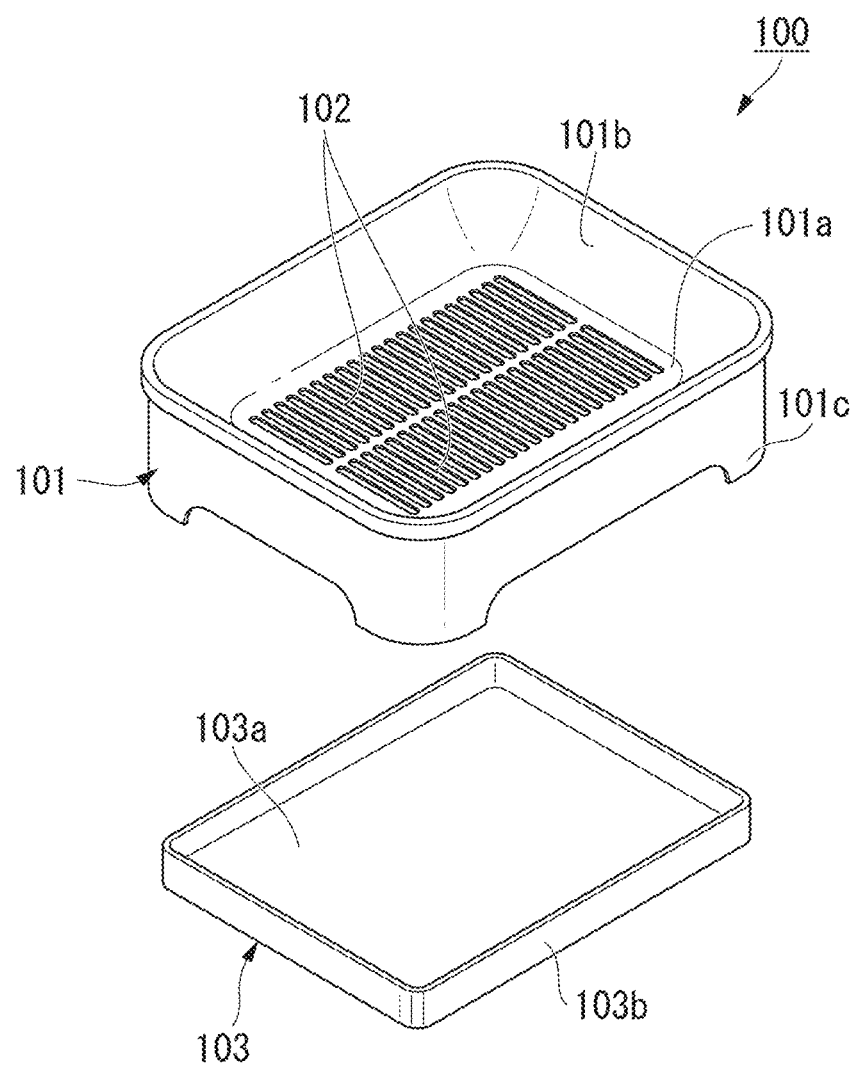
FIG. 1 is an exploded perspective view showing an animal toilet in which a urine examination container of an embodiment according to the present invention is installed.

Hereinafter, an embodiment of a urine examination container 1 according to the present invention will be described with reference to the drawings. In addition, in each embodiment described below, the corresponding components may be denoted by the same reference numerals and the description thereof may be omitted.

[Pet]

In the present invention, a pet refers to an animal raised by a person. In a narrower sense, a pet is an animal loved by its owner. Examples thereof include dogs and cats.

[Animal Toilet]

First, an animal toilet 100 in which the urine examination container 1 according to the embodiment can be installed will be described. FIG. 1 is an exploded perspective view showing the animal toilet 100 in which the urine examination container 1 according to an embodiment of the present invention is installed.

As shown in FIG. 1, the animal toilet 100 is intended for relatively small pets (kittens and puppies). The animal toilet 100 is used by being placed on an indoor floor or the like. The animal toilet 100 is formed in a rectangular shape in a plan view. Specifically, the animal toilet 100 includes at least an upper container 101 having a plurality of holes 102 formed therein, and a tray 103 for receiving and storing urine dropping from the holes 102. The shape in a plan view, the size, or the like of the animal toilet 100 can be appropriately changed.

The upper container 101 is arranged above the tray 103. The upper container 101 includes an upper bottom surface portion 101a having a plurality of holes 102 formed therein, an upper wall portion 101b standing upright from a peripheral edge of the upper bottom surface portion 101a, and a leg portion 101c extending downward from the upper bottom surface portion 101a.

The plurality of holes 102 is arranged at intervals in the central portion of the upper bottom surface portion 101a. The arrangement pattern of the plurality of holes 102 can be appropriately changed.

The leg portion 101c extends downward along an outer surface of the upper wall portion 101b at each corner of the upper bottom surface portion 101a. The animal toilet 100 is placed on a placement surface such as a floor via the leg portion 101c.

The tray 103 is formed in a shallow dish shape that opens upward. Specifically, the tray 103 has a tray bottom surface portion 103a and a tray side wall portion 103b standing upright from the peripheral edge of the tray bottom surface portion 103a. The tray 103 is set between the upper bottom surface portion 101a and the floor surface at a position overlapping at least the plurality of holes 102 in a plan view.

In the animal toilet 100, a pet can enter the upper container 101 across the upper wall portion 101b. The pet that has entered the upper container 101 excretes on the upper bottom surface portion 101a. Out of the excrement of the pet, feces do not pass through the plurality of holes 102 and remain on the upper bottom surface portion 101a, and urine passes through the plurality of holes 102 and are accumulated on the tray 103. After the pet excretes, the tray 103 can be accessed by removing the upper container 101 after the pet retreats from the upper container 101.

Figure 2:
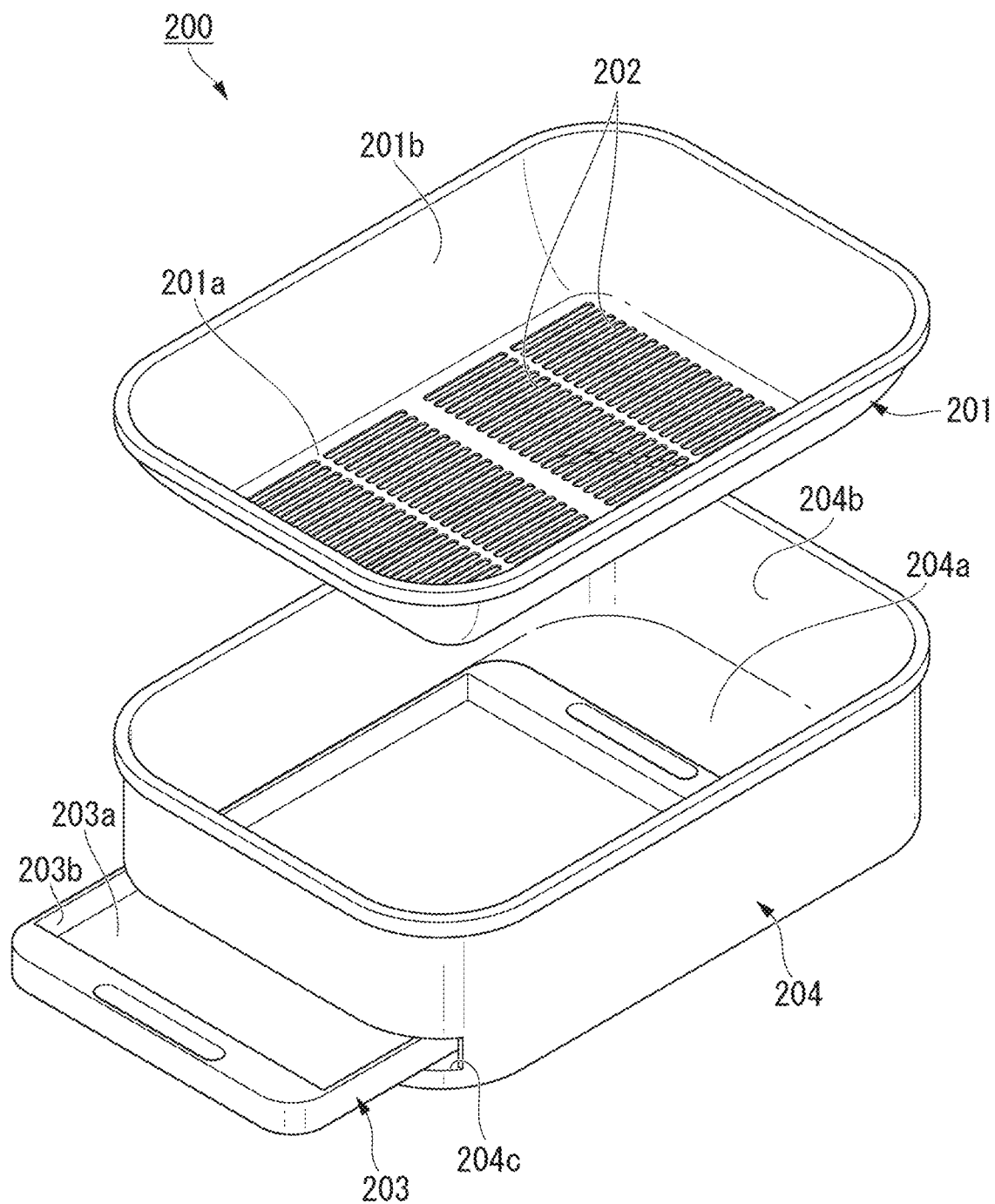
FIG. 2 is an exploded perspective view showing an animal toilet in which the urine examination container of an embodiment according to the present invention is installed.

FIG. 2 is an exploded perspective view showing an animal toilet 200 in which the urine examination container according to the embodiment of the present invention is installed.

As shown in FIG. 2, the animal toilet 200 is intended for pets (adult cats or dogs) that have passed their infancy. The animal toilet 200 is formed in a rectangular shape in a plan view. Specifically, the animal toilet 200 includes an upper container 201 having a plurality of holes 202 formed therein, a tray 203 for receiving and storing urine dropping from the holes 202, and a lower container 204 installed under the upper container 201.

The lower container 204 has a lower bottom surface portion 204a and a lower side wall portion 204b standing upright from the peripheral edge of the lower bottom surface portion 204a, and is formed in a box shape that opens upward. At least one insertion port 204c for inserting the tray 203 is formed in a lower portion of the lower side wall portion 204b.

The tray 203 is formed in a shallow dish shape that opens upward. The tray 203 has a tray bottom surface portion 203a and a tray side wall portion 203b standing upright from the peripheral edge of the tray bottom surface portion 203a. The tray 203 is configured to be insertable into the lower container 204 through the insertion port 204c.

The upper container 201 is mounted inside the lower container 204 from above. The upper container 201 is formed in a box shape having a shallower depth than the lower container. The upper container 201 includes an upper bottom surface portion 201a having a plurality of holes 202 formed therein, and an upper wall portion 201b standing upright from the peripheral edge of the upper bottom surface portion 201a. The upper container 201 is configured to be insertable into the lower container 204 through the upper end opening of the lower container 204. The upper container 201 is held in the lower container 204 in a state where the upper bottom surface portion 201a is separated from the lower bottom surface portion 204a by locking the upper wall portion 201b and the lower side wall portion 204b via a locking portion (not shown).

In the animal toilet 200, a pet can enter the upper container 201 across the upper wall portion 201b. The pet that has entered the upper container 201 is excreted on the upper bottom surface portion 201a. Among the excrement of the pet, feces remain on the upper bottom surface portion 201a without passing through the plurality of holes 202, and urine passes through the plurality of holes 202 and is accumulated on the tray 203. After the pet excretes, the tray 203 can be accessed by pulling out the tray 203 through the insertion port 204c.

First Embodiment

[Urine Examination Container]

Figure 3:
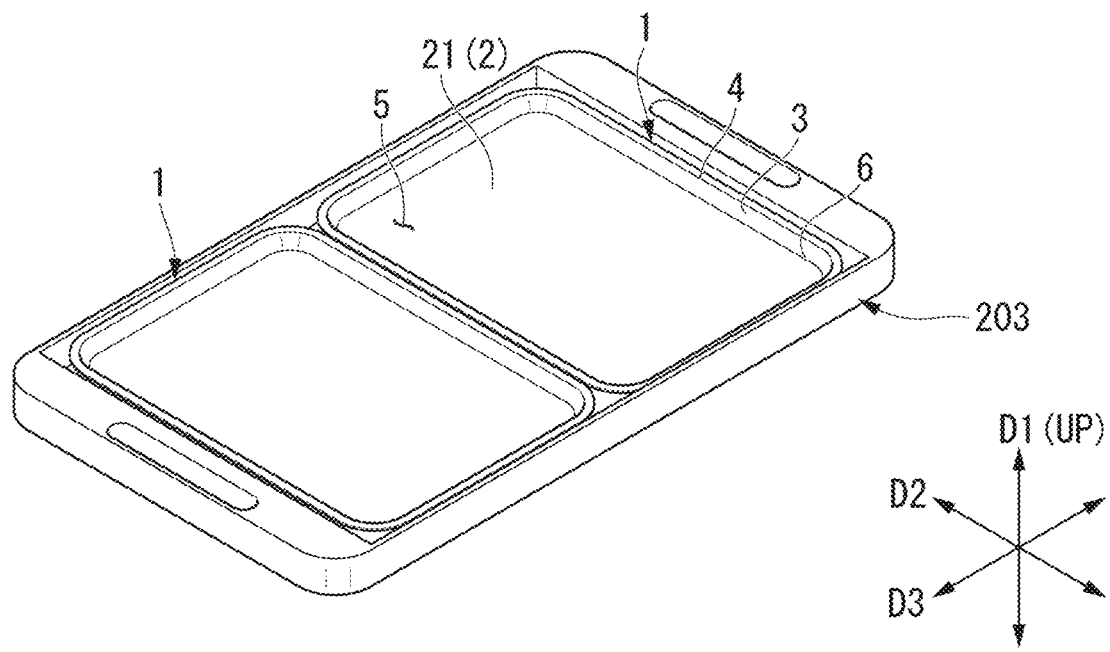
FIG. 3 is a perspective view showing an aspect in which the urine examination container of a first embodiment according to the present invention is installed on a tray of an animal toilet.

FIG. 3 is a perspective view showing an aspect in which the urine examination container 1 of a first embodiment according to the present invention is installed on the tray 203 of the animal toilet 200. In the specification of the present application, a vertical direction is described as a first direction D1 (arrow UP is upward). In addition, in a plan view viewed from the first direction D1, directions orthogonal to each other are referred to as a second direction D2 and a third direction D3, respectively. In the following description, a state in which the urine examination container 1 is set in the animal toilet 200 will be described as an example. However, the urine examination container 1 of the present embodiment can be also adopted in the animal toilet 100 or other various animal toilets.

As shown in FIG. 3, the urine examination container 1 is used by being installed on the tray bottom surface portion 203a in the tray 203 of the animal toilet 200. The urine examination container 1 collects the urine flowing into the tray 203 through the plurality of holes 202 for urine examination. The urine examination container 1 of the present embodiment is formed in a rectangular shape with the second direction D2 as the longitudinal direction in a plan view. One or two or more urine examination containers 1 can be installed side by side on the tray bottom surface portion 203a of the tray 200. A urine absorption sheet that absorbs urine may be installed on the tray bottom surface portion 203a. In a case where the urine absorption sheet is installed, the urine examination container 1 on a urine absorption surface of the urine absorption sheet may be installed so that the urine recovered for urine examination is not affected by an antibacterial agent contained in the absorption sheet.

Figure 4:
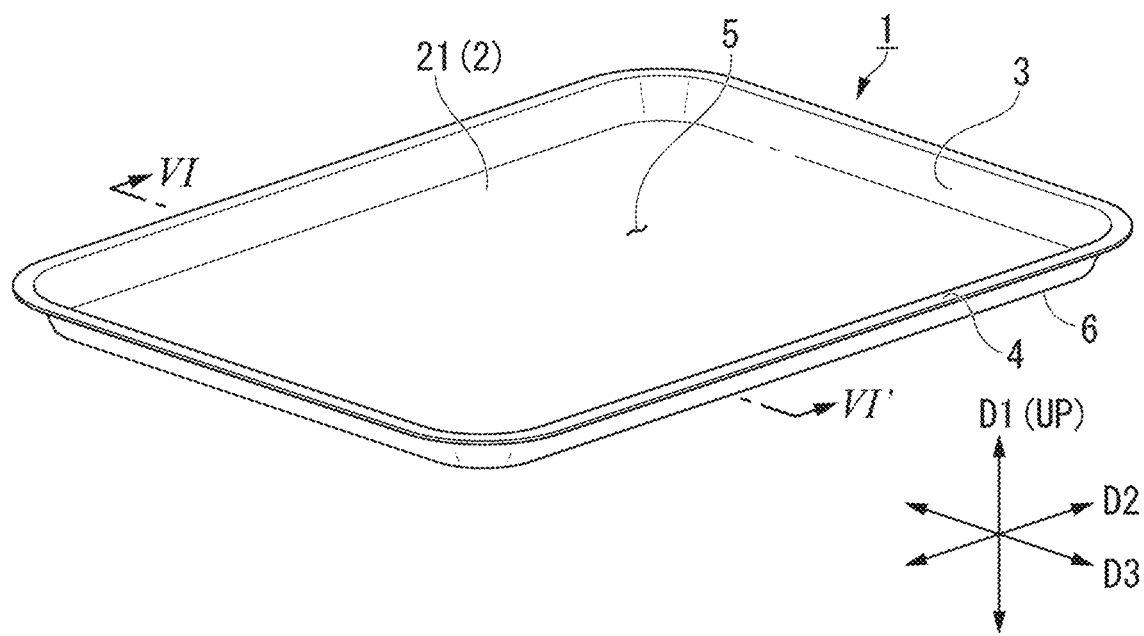
FIG. 4 is a perspective view of the urine examination container of the first embodiment according to the present invention.
Figure 5:
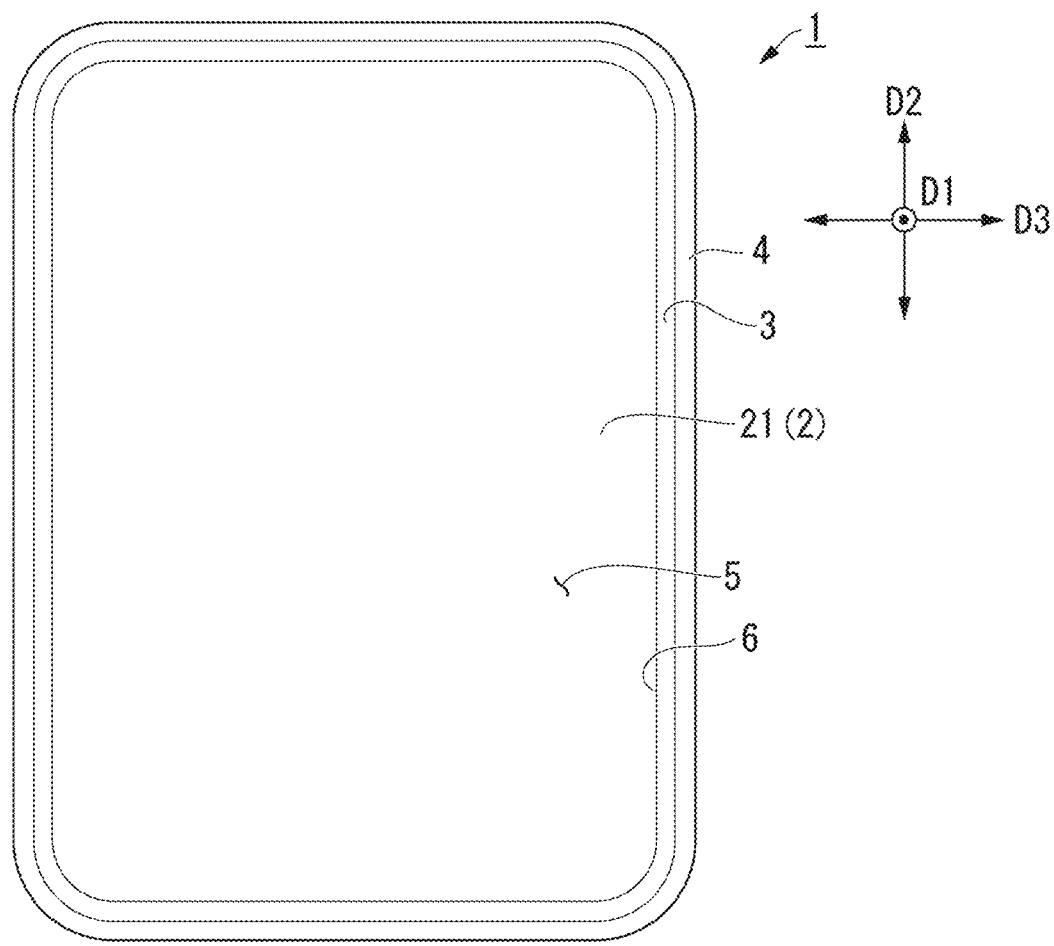
FIG. 5 is a plan view of the urine examination container of the first embodiment according to the present invention.
Figure 6:
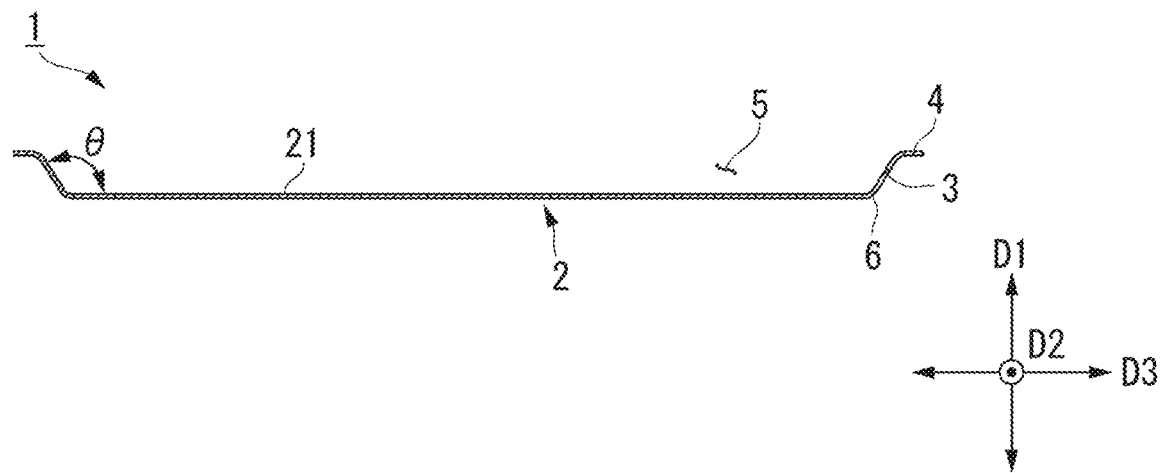
FIG. 6 is a sectional view of the urine examination container of the first embodiment according to the present invention, taken along line VI-VI' in FIG. 4.

FIG. 4 is a perspective view of the urine examination container 1 of the first embodiment according to the present invention. FIG. 5 is a plan view of the urine examination container 1 of the first embodiment according to the present invention. FIG. 6 is a sectional view of the urine examination container 1 of the first embodiment according to the present invention, taken along the line VI-VI' in FIG. 4.

As shown in FIGS. 4 to 6, the urine examination container 1 is formed in a shallow dish shape that opens upward. The urine examination container 1 is configured such that a bottom portion 2, a peripheral wall portion 3, and a grip portion 4 are integrally formed by performing press processing on a sheet-shaped base material.

The urine examination container 1 is formed of a material capable of performing press processing on paper, plastic, or the like. The bottom portion 2, the peripheral wall portion 3, and the grip portion 4 that form the urine examination container 1 are preferably made of the same material and are continuous. In particular, in the present embodiment, in order to prevent leakage of urine, as a material (base material) used for the urine examination container 1, for example, a laminated body in which a resin is laminated on both sides of paper, paper for hardening a fiber with a poorly water-soluble adhesive, paper for performing water resistance/oil resistance treatment, and a material having water-repellant properties such as resin are preferably used. As the resin, for example, polyethylene, polypropylene, polystyrene, polyvinyl chloride, ABS, AES, acrylic, thermosetting plastics (melanin resin, silicone resin, and the like) or thermoplastic resins (PPS, liquid crystal polymer, polycarbonate) are preferably used. In addition, as the material used for the urine examination container 1, a metal such as aluminum can be used. In a case where the same material is continuously formed, no gap is formed in the urine examination container 1, and thus all collected urine can be collected. However, each portion of the urine examination container 1 may be formed of different materials by a method other than press processing, for example.

As a method of inner surface treatment processing of a paper product used for the urine examination container 1, the Harvill processing is preferably used. In addition, as the processing of the material used for the urine examination container 1, water resistance/oil resistance treatment may be processed on the paper product itself, treatment of attaching paper and aluminum may be performed, and treatment of attaching a film onto a paperboard and the like may be performed, but the processing is not limited to these. The base paper on which the treatment of attaching paper and aluminum has been performed is called special functional paper.

<Bottom Portion>

As shown in FIG. 5, the bottom portion 2 has a rectangular shape when viewed from above. The plan view shape of the bottom portion 2 can be appropriately changed to a polygonal shape other than a rectangle, a circular shape, or the like as long as it is set to be equal to or less than the area of the tray bottom surface portions 103a and 203a.

<Peripheral Wall Portion>

The peripheral wall portion 3 extends upward from the outer peripheral edge 6 of the bottom portion 2 and surrounds the periphery of the bottom portion 2. The peripheral wall portion 3 defines a urine receiving portion 5 that opens upward together with the bottom portion 2. The height of the peripheral wall portion 3 is not particularly limited, but it is preferable to set the urine receiving portion 5 so that the urine receiving portion 5 has a volume capable of housing all the urine excreted by the pet at one time. In addition, the height of the peripheral wall portion 3 is preferably lower than the height of the trays 103 and 203 (the height of the tray side wall portions 103b and 203b). This is because the urine examination container 1 can be stably installed on the tray bottom surface portions 103a and 203a without the height of the peripheral wall portion 3 interfering with the height of the tray side wall portions 103b and 203b. In particular, the height from the bottom portion 2 to the upper edge of the peripheral wall portion 3 in the first direction D1 (the height of the peripheral wall portion 3) is preferably 1 mm to 40 mm, more preferably 3 mm to 33 mm, and further more preferably 5 mm to 28 mm. In a case where the height of the peripheral wall portion 3 is within the above range, it is possible to prevent strength deterioration or bending of the urine examination container 1 itself. In addition, in a case where the height of the peripheral wall portion 3 is within the above range, the urine examination container 1 can be taken in and out without being interfered with the height of the tray side wall portions 103b and 203b, and the collected urine can be stably held. Therefore, it is possible to prevent urine from leaking from the urine examination container 1.

<Angle Between Bottom Portion and Peripheral Wall Portion>

The angle θ between the bottom portion 2 and the peripheral wall portion 3 is an obtuse angle (90°<θ<180°). In the present embodiment, the angle θ is set to be 91° to 150°, for example.

It is preferable that the bottom portion 2 and the peripheral wall portion 3 are formed at an obtuse angle over the entire circumference of the urine examination container 1. However, the urine examination container 1 may have an obtuse angle formed with the bottom portion 2 at a portion of the peripheral wall portion 3 in a circumferential direction. The angle θ is more preferably set to 100° to 149°.

According to the present embodiment, the angle θ between the bottom portion 2 and the peripheral wall portion 3 is set to 150° or less, and thus the height of the peripheral wall portion 3 can be ensured. For this reason, even if a liquid level of the urine accumulated in the urine examination container 1 fluctuates due to vibration generated when the urine examination container 1 is taken out from the trays 103 and 203, leakage of the urine from the urine examination container 1 can be prevented.

In addition, according to the present embodiment, since the angle θ between the bottom portion 2 and the peripheral wall portion 3 is set to 91° or more, at a time of production of the urine examination container 1, it is possible to suppress damage caused on an inner surface of the peripheral wall portion 3 by a mold and an inner surface of the peripheral wall portion 3 rubbing against each other at a time of mold opening. For this reason, the quality or yield of the urine examination container 1 can be improved.

In a case where the urine recovered in the urine examination container 1 is collected with a test paper, the test paper is soaked in the urine in the urine examination container 1 and then the test paper is pulled up. At this time, the test paper was pressed against the inner surface of the peripheral wall portion 3 which is inclined at an obtuse angle with respect to the bottom portion 2, and is pulled upward while following the inclination of the peripheral wall portion 3. With this, excess urine adhered on the test paper can be rubbed against the peripheral wall portion 3. With this, it is possible to take out a test paper after removing the excess urine adhered to the test paper. That is, the inner surface of the peripheral wall portion 3 functions as a rubbing portion that retains excess urine adhered to the test paper in the urine examination container 1.

In addition, in the present embodiment, since the peripheral wall portion 3 is formed at an obtuse angle with respect to the bottom portion 2, if urine adheres to the inner surface of the peripheral wall portion 3, the urine flows to the bottom portion 2 along the inner surface of the peripheral wall portion 3. With this, urine can be easily collected for urine examination.

In a case where the angle θ between the bottom portion 2 and the peripheral wall portion 3 is a right angle (90°) or an acute angle (0°<θ<90°), if it is attempted to remove the excess urine adhered to the test paper from the peripheral wall portion 3, it is required to move the test paper to the outer side of the peripheral wall portion 3 while pulling the test paper upward in a state of being pressed against the peripheral wall portion 3. At this time, if only the upper end portion (handle) of the test paper is positioned on the outer side the peripheral wall portion 3 in a state where the lower end portion of the test paper is still pressed against the inner surface of the peripheral wall portion 3, the lower end portion of the test paper passes the upper edge of the peripheral wall portion 3, and then the test paper tends to be restored and deformed. At this time, there is a possibility that the urine adhered to the lower end portion of the test paper may be repelled to the outer side of the peripheral wall portion 3, and the urine is scattered around the urine examination container 1. In addition, in a case where the lower end portion of the test paper passes the upper edge of the peripheral wall portion 3, there is a possibility that the urine adhered to the inner surface of the peripheral wall portion 3 passes over the upper edge of the peripheral wall portion 3, and drops along the outer surface of the peripheral wall portion 3. For this reason, it is not hygienically preferable.

<Grip Portion>

The grip portion 4 projects outward from the peripheral wall portion 3. For example, the grip portion 4 is formed to project outward from the upper end portion of the peripheral wall portion 3. In the present embodiment, the grip portion 4 may be provided so as to continuously surround the outer circumference of the peripheral wall portion 3. The position, the shape, or the like of the grip portion 4 can be appropriately changed as long as the urine receiving portion 5 can be interposed therebetween and can be gripped by both hands. For example, the grip portion 4 may be provided at two locations on the outer side the facing peripheral wall portion 3, or may be provided at one location on each of the four sides forming the peripheral wall portion 3, that is, the total of four locations. In this case, the urine examination container 1 can be easily transported by gripping the locations of the two facing grip portions 4, and the urine examination container 1 can be treated hygienically.

A lower limit value of the length from the base end (boundary portion with the peripheral wall portion 3) of the grip portion 4 to the tip (hereinafter, referred to as the projecting length) is preferably 3 mm or more, more preferably 5 mm or more, and further more preferably 7 mm or more. According to the present embodiment, it is possible to lift the urine examination container 1 by gripping the grip portion 4 by hand. In addition, it is possible to easily pick up the urine examination container 1 by finger, and it is possible to improve the handleability.

In particular, in a case where the grip portion 4 is several cm or more, the grip portion can be fixed to the trays 103 and 203. However, considering the versatility of the container, the upper limit value of the projecting length of the grip portion 4 is preferably 60 mm or less, more preferably 50 mm or less, and further more preferably 40 mm or less.

<Use Method of Urine Examination Container 1>

Subsequently, a use method of the urine examination container 1 described above will be described.

The urine examination container 1 of the present embodiment is used by being set on the trays 103 and 203 of the animal toilets 100 and 200 described above. In the following description, a case where the urine examination container 1 is used in the animal toilet 200 will be described as an example.

First, as shown in FIG. 3, the tray 203 is pulled out from the lower container 204, and the urine examination container 1 is set on the tray 203. In the present embodiment, two urine examination containers 1 are arranged on the tray 203 in a state where the third direction D3 is aligned with the longitudinal direction of the tray 203. At this time, it is preferable that the grip portions 4 of the adjacent urine examination containers 1 are installed by overlapping each other. With this, it is possible to suppress formation of a gap between the urine examination containers 1 and to recover the urine without spilling. However, the urine examination container 1 does not need to be spread over the entire tray 203, and may be disposed at a position overlapping at least a part of the hole 202 in a plan view.

Subsequently, the tray 203 is set in the lower container 204 through the insertion port 204c. With this, the urine examination container 1 is set below the hole 202. In this state, the owner waits for the pet to excrete. When the pet excretes, urine and feces of the excrement are separated by the upper bottom surface portion 201a. That is, of the excrement, only the urine drops below the upper bottom surface portion 201a through the hole 202. The urine that has dropped downward is recovered in the urine receiving portion 5 through the upper end opening of the urine receiving portion 5.

For example, a cat tends to excrete in a direction along the longitudinal direction of the animal toilet 200. By arranging two urine examination containers 1 on the tray 203 in a state where the third direction D3 of the urine examination containers 1 is aligned with the longitudinal direction of the tray 203, by arranging the two urine examination containers 1 on the tray 203, the excreted urine can be recovered in at least one of the arranged two urine examination containers 1. Cats have a habit (preference) that the direction of excretion by each individual is almost the same each time. Specifically, some cats excrete on the upper bottom surface portion 201a with the face facing a side where the insertion port 204c of the animal toilet 200 is present, and some cats excrete on the upper bottom surface portion 201a with the side with the tail (buttock) facing on a side where the insertion port 204c is present.

Considering the habit of the cat, one urine examination container 1 may be installed on the tray 203. For example, of the two urine examination containers 1 shown in FIG. 3, in a state where one of the urine examination containers 1 is removed and the remaining one urine examination container 1 is installed on the tray 203, the tray 203 is set in the lower container 204. At this time, the urine absorption sheet is installed so that the tray bottom surface portion 203a is covered, and in a state where the third direction D3 of the urine examination container 1 is aligned with the longitudinal direction of the tray 203, one urine examination container 1 is preferably disposed on the urine absorption sheet. With this, it comes to a state where one urine examination container 1 is disposed only on the tray 203 with respect to the center in the longitudinal direction, of the tray 203.

Then, the owner checks the tray 203 after a specific cat (owner's cat) has excreted, and in a case where urine can be recovered in the urine examination container 1, the urine examination container 1 may be disposed at the same position (that is, one side in the longitudinal direction in the animal toilet 200) from the next time. In a case where the urine cannot be recovered in the urine examination container 1, the urine examination container 1 may be positioned at a position different from the previous position (that is, the other side in the longitudinal direction of the animal toilet 200). In this case, the position of the urine examination container 1 with respect to the tray 203 may be changed, or the position of the urine examination container 1 with respect to the tray 203 may be left as it is and the tray 203 may be set in a reverse direction. With this, since the urine examination container 1 is arranged on the other side in the longitudinal direction of the animal toilet 200, the urine can be recovered in the urine examination container 1 from the next excretion. If the urine absorption sheet is installed, although the urine examination container 1 cannot be recovered in the urine examination container 1, since the urine is absorbed in the urine absorption sheet, the tray 203 can be used hygienically.

In a case where the urine examination container 1 is made large so that one urine examination container 1 is aligned with the entire hole 202 in a plan view and one urine examination container 1 is spread over the entire tray bottom surface portion 203a, the material cost is increased and the versatility is lowered. In addition, in a case where a large urine examination container 1 is used, out of the urine examination container 1, a region of the urine examination container 1 which is not used (urine is not adhered) is larger than a region where urine is collected (urine is adhered). Therefore, the material cost is high, the discarding cost is high, and thus the large urine examination container is not economically preferable.

On the other hand, in the present embodiment, by setting an outer shape of the urine examination container 1 in a plan view to a size of a degree of spreading out the entire tray bottom surface portion 203a by a plurality of the urine examination containers 1, it is possible to reduce the cost of the urine examination container 1 itself. In addition, it is possible to set various trays with different outer shapes in a plan view and it is possible to increase the versatility of the urine examination container 1. In addition, in a state where the plurality of urine examination containers 1 are spread, in a case where urine is collected in only one urine examination container 1, only one urine examination container 1 is replaced (other urine examination containers 1 remain unchanged) and thus running costs can be reduced.

In a case where the excretion of the pet is completed, the urine examination container 1 is taken out. Specifically, the tray 203 is pulled out through the insertion port 204c. With this, the urine examination container 1 comes to an accessible state.

Subsequently, the recovered urine is checked. As the recovered urine, urine within 1 hour after excretion of the pet is preferably used. This is to prevent changes in examination results due to changes or oxidation of urine components. As a method for the owner to check urine, there are visual examination and urine test paper examination.

In the visual examination, the color or turbidity of the recovered urine in the urine examination container 1 are visually observed. By regularly performing visual examination, it is possible to recognize changes in the color or turbidity of the urine of the pet, and thus it is possible to understand the health condition of the pet. In addition, in a case where the collected urine is small, the urine examination container 1 is tilted by gripping a part of the grip portion 4, and visual examination may be performed in a state where the urine is gathered on one side of the urine examination container 1.

In the urine test paper examination, the urine recovered in the urine examination container 1 is impregnated into the test paper, and the health condition of the pet is evaluated based on the color of the test paper. The test paper used in the present embodiment is, for example, a protein test paper. The color of the protein test paper changes in response to a protein component contained in the urine. For example, in a case where the color of the test paper is yellow or yellowish green, it is judged as normal, and in a case where the color of the test paper becomes dark green, it is judged as hyper proteinuria.

The urine test paper examination can be performed with the urine examination container 1 set on the tray 203. Specifically, the test paper is caused to enter the urine examination container 1 through the upper end opening of the urine receiving portion 5, and the test paper is dipped in the urine. Then, after the urine has sufficiently permeated the test paper, the test paper is pulled up from the urine examination container 1. At this time, the test paper is pressed against the inner surface of the peripheral wall portion 3 and pulled upward while following the inclination of the peripheral wall portion 3. With this, excess urine adhered to the test paper can be rubbed against the peripheral wall portion 3. With this, it is possible to take out a test paper after removing the excess urine adhered to the test paper. In a case where the collected urine is small, the urine examination container 1 is tilted by gripping a part of the grip portion 4, and the test paper may be dipped in the urine in a state where the urine is gathered on one side of the urine examination container 1.

For a detailed examination, the urine recovered in the urine examination container 1 is transferred to a urine collection container, and a facility such as a hospital is requested to perform examination. The urine collection container is preferably a container that can hygienically store a certain amount of urine. Examples of this type of urine collection container include a container made of elastically deformable resin with a lid. In this configuration, the person who collects the urine (the owner and the like) immerses a suction port in the urine in a state where the urine collection container is elastically deformed. After that, the urine collection container is restored and deformed, and the urine is sucked into the urine collection container through the suction port. As the urine collection container, in addition to the above-described container with a lid, a container made of an absorbent material such as a porous member may be used to collect urine. In addition, in the present embodiment, a case where urine is directly collected by the elastically deformable container with a lid has been described, but the present invention is not limited thereto, and urine sucked up with a dropper or the like may be transferred to the urine collection container.

As described above, when the detailed examination is performed in a hospital, in a case where the urine collected in the urine examination container 1 is put in the urine collection container, the urine can be brought to the hospital.

After the visual examination, after the urine test paper examination, or after urine is collected in the urine collection container, the urine examination container 1 is discarded. Specifically, of the grip portion 4, the portions facing each other in the second direction D2 or the third direction D3 are gripped by both hands, and the urine examination container 1 is pulled up. Then, after the residual urine flows into the urine examination container 1, the urine examination container 1 is discarded. The urine remaining in the urine examination container 1 may be absorbed in the urine absorption sheet.

As a method of removing excess urine adhered to the test paper, a method of rubbing the test paper against urine adhered to a urine absorption sheet used for an animal toilet to absorb the excess urine is considered. However, since the urine absorption sheet used for the animal toilet contains an antibacterial agent and the like, in a case where excess urine adhered to the test paper is removed by adhering it to the urine absorption sheet, components derived from the urine absorption sheet are mixed with urine and is likely to have an influence on the test result, and thus it is not preferable.

According to the present embodiment, since the peripheral wall portion 3 is formed to have an obtuse angle, in a case where urine adheres to the inner surface of the peripheral wall portion 3, the urine flows along the inner surface of the peripheral wall portion 3 to the bottom portion 2. With this, urine can be easily collected for urine examination. In addition, by gripping two facing locations of the grip portion 4 formed so as to project outward from the upper end portion of the peripheral wall portion 3, the urine examination container 1 can be easily transported, and the urine examination container 1 can be hygienically treated. In addition, according to the present embodiment, the test paper is pressed against the peripheral wall portion 3 that is inclined at an obtuse angle with respect to the bottom portion 2 and pulled up, and thus excess urine adhered to the test paper is rubbed against the peripheral wall portion 3. With this, it is possible to take out a test paper after removing the excess urine adhered to the test paper. In addition, according to the present embodiment, the owner can conveniently collect the urine accumulated in the urine examination container. For this reason, the owner can collect the urine of the pet without having to be present at the moment of excretion of the pet, and thus the time and labor required for the owner to collect the urine can be reduced. In addition, since the owner is not present at the moment of excretion of the pet, the pet can urinate without being stressed, and the owner can collect the urine.

Second Embodiment

Figure 7:
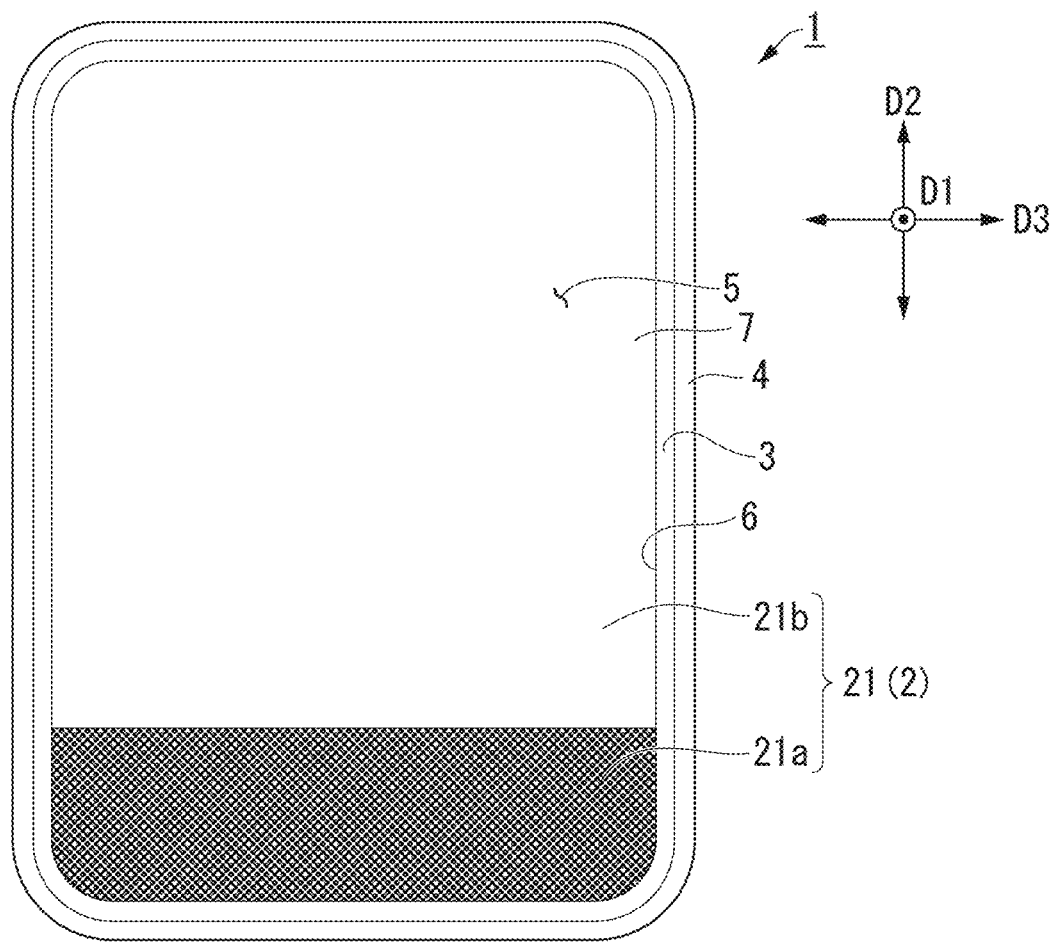
FIG. 7 is a plan view of a urine examination container of a second embodiment according to the present invention.

Subsequently, a second embodiment will be described. FIG. 7 is a plan view of the urine examination container 1 of a second embodiment according to the present invention.

The present embodiment is different from the above-described first embodiment in that the health condition of the pet can be understood by observing urine with the bottom portion 2 of the urine examination container 1 as a background.

As shown in FIG. 7, the upper surface of the bottom portion 21 is divided into a crystal confirmation region 21*a* and a color confirmation region 21*b*. The crystal confirmation region 21*a* is a region in which the upper surface of the bottom portion 21 is colored black, for example. In the present embodiment, the crystal confirmation region 21*a* includes a first side of the outer peripheral portion 7 along the third direction D3 on the upper surface of the bottom portion 21, and is set to one side from the center in the second direction D2. In the crystal confirmation region 21*a*, crystals that compose urinary stones such as struvite stones contained in urine can be easily visually recognized with black color of the upper surface of the bottom portion 21 as a background.

The color confirmation region 21*b* is a region in which the upper surface of the bottom portion 21 has a white color, for example. In the present embodiment, the color confirmation region 21*b* is a region other than the crystal confirmation region 21*a* of the upper surface of the bottom portion 21. That is, the color confirmation region 21*b* includes a second side along the third direction D3 in the outer peripheral portion 7, and is set to a region including a center in the second direction D2. In the present embodiment, the ratio of the lengths of the crystal confirmation region 21*a* and the color confirmation region 21*b* in the second direction D2 is preferably set to 1:1 to 1:3, for example. In particular, as in the shown example, the ratio of the lengths of the crystal confirmation region 21*a* and the color confirmation region 21*b* in the second direction D2 is more preferably set to 1:3.

The ratio of the lengths of the crystal confirmation region 21*a* and the color confirmation region 21*b* in the second direction D2 can be appropriately changed. In addition, the crystal confirmation region 21*a* and the color confirmation region 21*b* may be divided in the third direction D3. In addition, the crystal confirmation region 21*a* and the color confirmation region 21*b* are not limited to the second direction D2 and the third direction D3, and can be divided into arbitrary shapes. However, in a case of containing the crystal confirmation region 21a and the color confirmation region 21b, it is preferable that the crystal confirmation region 21a include at least a part of the outer peripheral portion 7.

In addition, in the present embodiment, the upper surface of the bottom portion 21 may have the crystal confirmation region 21a in at least a part thereof. Therefore, in the second embodiment, the upper surface of the bottom portion 21 may not have the color confirmation region 21b. In addition, in the present embodiment, a case where the crystal confirmation region 21a is black and the color confirmation region 21b is white has been described, but the present invention is not limited to this configuration. For example, the crystal confirmation region 21a may be a color that allows urine stones to be visually recognized and may be darker than the color confirmation region 21b.

According to the present embodiment, the same effect as that of the above-described embodiment can be exhibited, and with the upper surface of the bottom portion 21 of the bottom portion 2 as a background, the presence of crystals in urine can be easily confirmed, and the health condition of the pet can be understood. For this reason, a simpler examination is possible.

Third Embodiment

Figure 8:
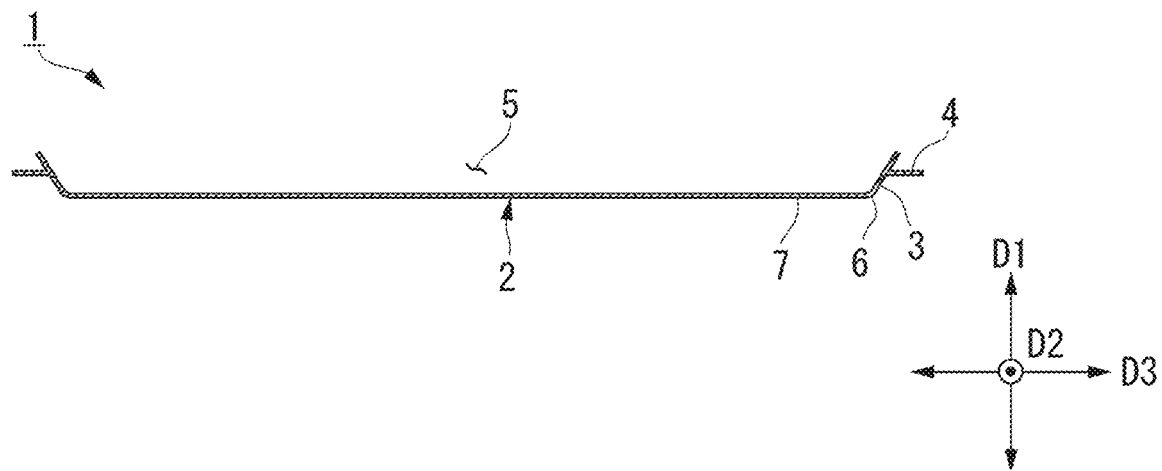
FIG. 8 is a side view of a urine examination container of a third embodiment according to the present invention.

Subsequently, a third embodiment will be described. FIG. 8 is a sectional view of the urine examination container 1 according to a third embodiment.

In the present embodiment, a position of the grip portion 4 is different from that in the first embodiment described above.

In the urine examination container 1 shown in FIG. 8, the grip portion 4 is provided so as to project outward in the middle between the upper end portion of the peripheral wall portion 3 and the outer peripheral edge 6 of the bottom portion 2. Specifically, the grip portion 4 is arranged at the same position as the center of the peripheral wall portion 3 in the first direction D1, or at a portion positioned above the center.

According to this configuration, the same effect as that of the above-described embodiment is exhibited, and the location in which the grip portion 4 is provided in a plan view seen from above in the first direction D1 is positioned on an inner side from the upper end portion of the peripheral wall portion 3. Therefore, an outer shape in the plan view is reduced. By having the configuration in which the grip portion 4 projects outward from the middle of the peripheral wall portion 3, in a case where the projecting length of the grip portion 4 is equivalent to that in the configuration in which the grip portion 4 projects outward from the upper end portion of the peripheral wall portion 3, in the configuration in which the grip portion 4 projects outward from the middle of the peripheral wall portion 3, it is possible to decrease an overhanging amount of the grip portion 4 of the peripheral wall portion 3, and the outer shape in a plan view of the urine examination container 1 is reduced. In addition, in the plan view seen from above in the first direction D1, the grip portion 4 is positioned on an inner side from the upper end portion of the peripheral wall portion 3, and thus it is possible to set a configuration in which urine is less likely to be in the grip portion 4, and it is possible to use the urine examination container 1 hygienically.

Fourth Embodiment

Figure 9:
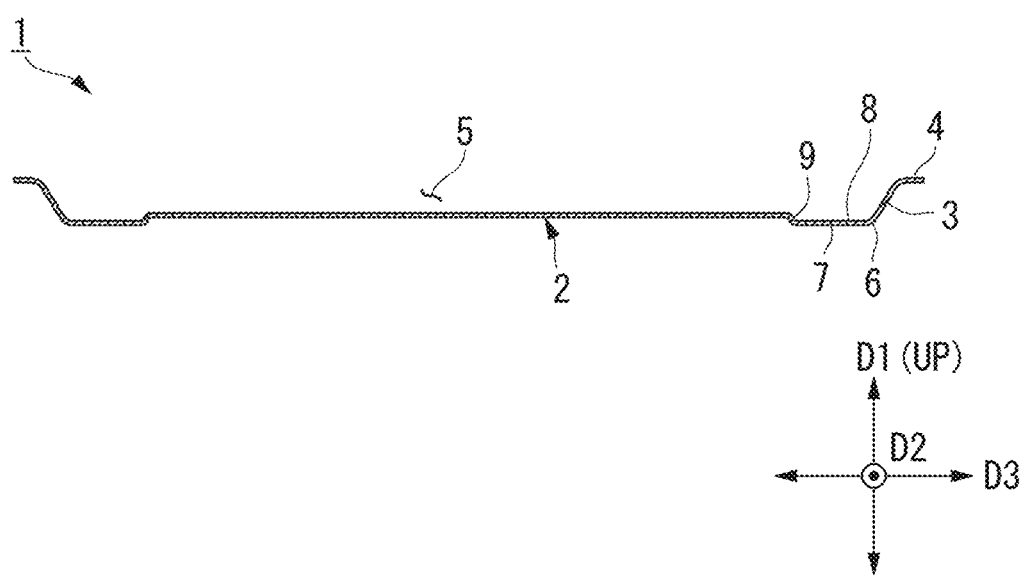
FIG. 9 is a sectional view of a urine examination container of a fourth embodiment according to the present invention.

Subsequently, a fourth embodiment will be described. FIG. 9 is a sectional view of the urine examination container 1 according to the fourth embodiment.

The present embodiment is different from the above-described first embodiment in that the bottom portion 2 has a groove portion 8.

The bottom portion 2 of the urine examination container 1 of the present embodiment has a groove portion 8. The groove portion 8 is formed in a frame shape along the outer peripheral portion 7 of the bottom portion 2 in a plan view. The groove portion 8 is a portion in which the excreted urine in the urine receiving portion 5 is preferentially stored. The groove portion 8 is defined by a lower end portion (outer peripheral edge 6 of bottom portion 2) of the peripheral wall portion 3, an outer peripheral portion 7 of the bottom portion 2, and an inner wall portion 9 connected to an inner peripheral portion of the bottom portion 2 extending upward from the inner peripheral edge of the outer peripheral portion 7. That is, the groove portion 8 of the present embodiment is formed by forming the bottom portion 2 into a corrugated shape in a sectional view when the urine examination container is formed by press processing. In the present embodiment, the outer peripheral portion 7 refers to a portion that surrounds the bottom portion 2 with a constant width toward the inner side of the bottom portion 2 from the outer peripheral edge 6 of the bottom portion 2 in a plan view.

In a case where the urine examination container 1 is set on the tray 203, the lower surface of the outer peripheral portion 7 of the bottom portion 2 is in contact with the upper surface of the tray bottom surface portion 203a, and the inner peripheral portion is installed in a state of being separated from the upper surface of the tray bottom surface portion 203a.

According to the present embodiment, the same effects as those of the above-described embodiments are exhibited, and urine can be locally accumulated in the groove portion 8 of the bottom portion 2. For this reason, even in a case where an amount of urine per one time is small, by providing the groove portion 8 in the bottom portion 2, it is possible to store a certain amount of urine for urine examination to be dipped in the test paper. In addition, in a case where the groove portion 8 is formed in the outer peripheral portion 7 of the bottom portion 2, the strength of the urine examination container 1 can be increased. For this reason, the width of the outer peripheral portion 7 is preferably set such that the width of the peripheral portion 7 ensures installation stability and is equal to or more than the width of the test paper.

Moreover, in the present embodiment, since the groove portion 8 is formed in the outer peripheral portion 7 of the bottom portion 2, in a case where the urine examination container 1 is formed by integral formation by press molding, for example, a bent portion between the peripheral wall portion 3 and the bottom portion 2 becomes a part of the groove portion 8, and thus complication of the shape due to the addition of the groove portion 8 is suppressed. In addition, according to the present embodiment, since the groove portion 8 functions as a bead of the bottom portion 2, the strength of the urine examination container 1 itself can be increased without increasing the thickness of the bottom portion 2. In addition, according to the present aspect, in a case where a part of the grip portion 4 of the urine examination container 1 is gripped and lifted by hand and the urine examination container 1 is tilted, urine is likely to be accumulated in the groove portion 8 of the outer peripheral portion 7 positioned opposite to the part gripped by the hand.

For this reason, the urine adhered to the test paper is easily gathered, and it becomes easier to collect the urine.

Modification Example

Figure 10:
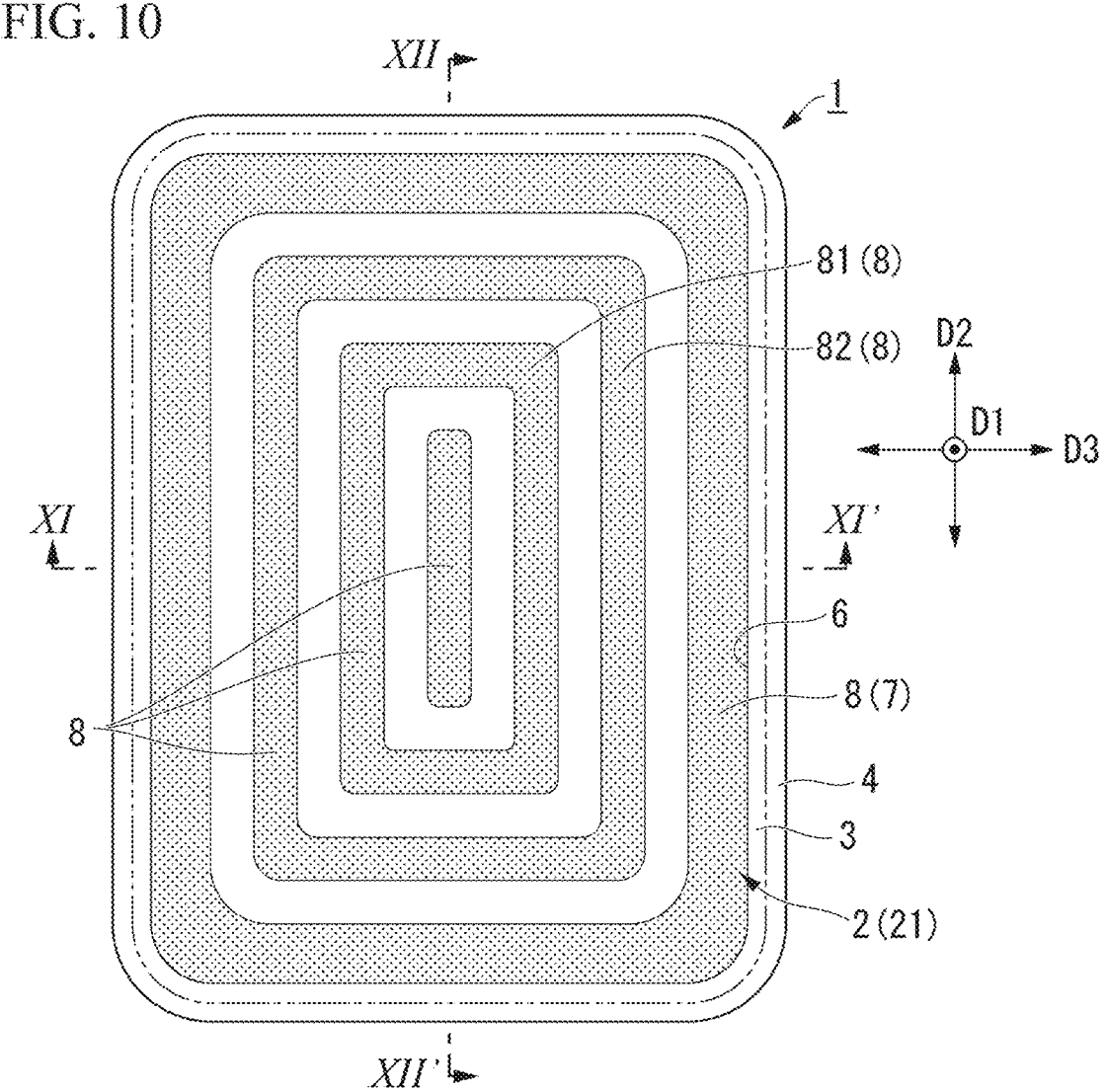
FIG. 10 is a plan view of a urine examination container of another embodiment according to the present invention.
Figure 11:
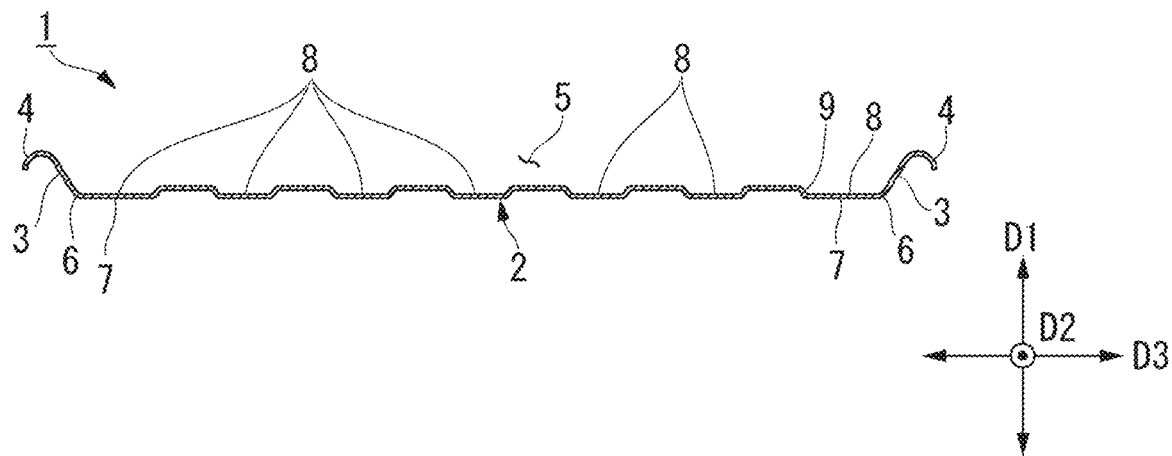
FIG. 11 is a sectional view of a urine examination container of another embodiment according to the present invention, taken along line XI-XI' in FIG. 10.
Figure 12:
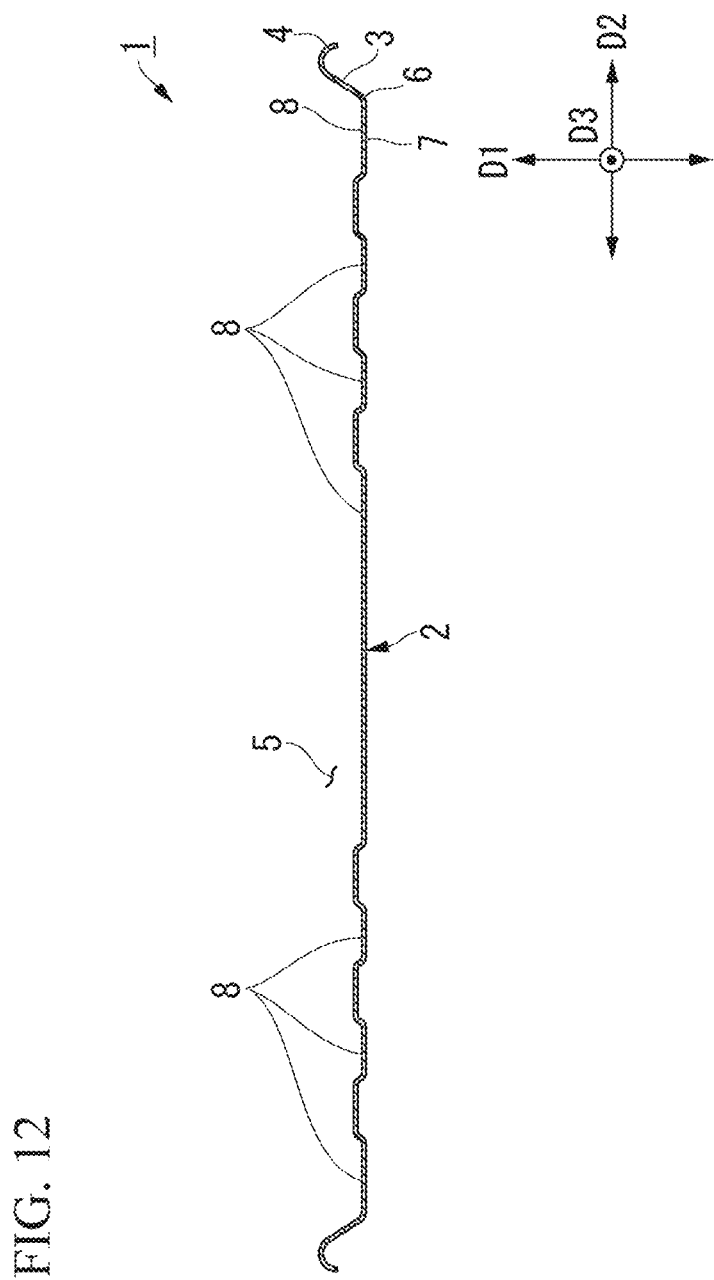
FIG. 12 is a sectional view of a urine examination container of another embodiment according to the present invention, taken along line XII-XII' in FIG. 10.

FIG. 10 is a plan view of a urine examination container 1 of another embodiment according to the present invention. FIG. 11 is a sectional view of the urine examination container 1 according to another embodiment of the present invention, taken along the line XI-XI' in FIG. 10. FIG. 12 is a sectional view of the urine examination container 1 according to another embodiment of the present invention, taken along the line XII-XII' in FIG. 10.

In the above-described embodiment, the configuration in which the groove portion 8 is formed in a frame shape in a plan view has been described, but the configuration is not limited thereto. As shown in FIGS. 10 to 12, a plurality of groove portions 8 may be formed on the upper surface of the bottom portion 21. A plurality of groove portions 8 are arranged concentrically in a plan view with the intersection of diagonal lines as the center in the substantially rectangular bottom portion 2. Specifically, as shown in FIG. 10, each groove portion has a similar shape to the outer peripheral edge 6 of the bottom portion 2. Of the groove portions 8, other groove portions 82 positioned on the outer side from one groove portion 81 surround the periphery of the one groove portion 81.

According to this configuration, the number of the groove portions 8 that function as the beads of the bottom portion 2 increases, and thus the strength of the urine examination container 1 itself can be further increased without increasing the thickness of the bottom portion 2.

In addition, the arrangement pattern of the groove portions 8 in a plan view can be appropriately changed. The groove portion 8 may be present extending in a plurality of straight or wavy rows in a plan view, for example, along the second direction D2 or the third direction D3, or circular or triangular groove portions may be arranged in a striped pattern.

In the above-described embodiment, the configuration in which the grip portion 4 linearly projects in a direction orthogonal to the first direction D1 has been described, but the configuration is not limited thereto.

The grip portion 4 may be present extending downward in a direction toward the outside (the side separated from the peripheral wall portion 3). According to the present configuration, in a case where a plurality of urine examination containers 1 are arranged on the tray, the grip portions 4 of the adjacent urine examination containers 1 are overlapped with each other, and thus the grip portions 4 are hooked to each other in a direction orthogonal to the first direction D1. With this, a connection portion, in which the grip portions 4 of the two or more adjacent urine examination containers 1 are overlapped, hardly comes off. In addition, in a case where the urine examination container 1 is carried around, it becomes easy to hook a finger or hand on a lower surface of the grip portion 4 and a tip of the grip portion 4, and thus the urine examination container can be held more easily and the handleability is improved.

Fifth Embodiment

Figure 13:
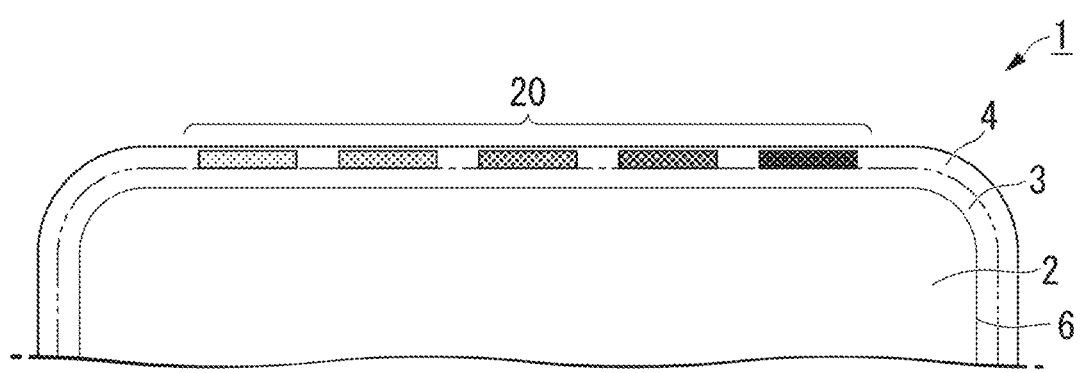
FIG. 13 is an enlarged plan view of a urine examination container of a fifth embodiment according to the present invention.
Figure 13:
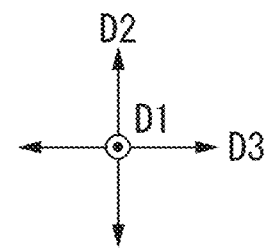

Subsequently, a fifth embodiment will be described. FIG. 13 is an enlarged plan view of a urine examination container 1 according to a fifth embodiment.

The present embodiment is different from the above-described embodiments in that the urine examination container 1 has a display portion 20 of urine examination reference.

In the present embodiment, as shown in FIG. 13, the display portion 20 is formed on a surface of the urine examination container 1 and indicates urine examination evaluation reference. Specifically, the display portion 20 is attached to a part of the upper surface of the grip portion 4. The display portion 20 may be used as an evaluation reference for urine examination, which can be determined by observing discoloration of the test paper for examining proteinuria, specific gravity, pH, urine sugar, and the like. In addition, the display portion 20 may use the color of urine as it is as an evaluation reference.

The display portion 20 can display at least one of the color for each evaluation reference value of the test paper or the color for each evaluation reference value of the urine itself on the surface of the urine examination container 1 as the display portion 20 for the urine examination evaluation reference. The color for each evaluation reference value used in the display portion 20 may be displayed in gradations from light color to dark color, and a single color as a reference value or a single color as a critical value is displayed in one or more colors. The urine examination evaluation reference displayed on the display portion 20 may be one type, or may be two or more types. If a plurality of urine examination results can be obtained at one time, it becomes easier for the breeder to manage the health of the pet.

In addition, on the display portion 20, there may be also described cautions such as "let's compare the color of urine", "let's use urine within 1 hour", "apply to urine for ~second, let it dry for ~second and observe", and the like.

According to the present embodiment, for example, it is not required to perform comparison with the evaluation reference described on the test paper or the package of the urine examination container 1, and the urine and the evaluation reference can be visually recognized at one time, and thus the evaluation becomes easy. The package is discarded once the contents are removed in many cases. If the urine examination evaluation reference is described only in the package, it will be impossible to examine the collected urine. However, according to the present embodiment, even if the package in which the urine examination evaluation reference is described is discarded, it is possible to obtain the urine examination result on the display portion 20.

In particular, in the present embodiment, the display portion 20 is attached to the upper surface of the grip portion 4.

According to this configuration, since the grip portion 4 is extremely unlikely to have urine after the excretion of the pet, the evaluation reference of the display portion 20 can be easily seen. In addition, according to this configuration, since the display portion 20 can be easily arranged in the urine examination container 1 at a position where it is difficult to be immersed in urine, of the urine examination container 1, even in a state where the urine is housed in the urine receiving portion 5, the collected urine and the evaluation reference of the display portion 20 are easily compared, and the evaluation can be easily performed.

Modification Example

In the embodiment described above, the configuration in which the display portion 20 is formed on the upper surface of the grip portion 4 has been described, but the configuration is not limited thereto.

The display portion 20 indicating the urine examination evaluation reference may be formed on a surface of the urine examination container 1 that faces upward. In this case, in addition to the upper surface of the grip portion 4, the inner surface of the peripheral wall portion 3, the upper surface of the bottom portion 21, or the like may be used.

According to the present configuration, the urine and the evaluation reference can be visually checked without having to compare thereof with the evaluation reference described on the package, and thus the evaluation becomes easy. In particular, since the display portion 20 is attached to the inner surface of the peripheral wall portion 3 of the surface that faces upward of the urine examination container 1, a distance between the urine accumulated in the bottom portion 2 and the display portion 20 becomes short. Therefore, in particular, in a case of performing visual examination, it is possible to easily compare the color or turbidity of urine with the evaluation reference of the display portion 20. However, the display portion 20 can be attached to an arbitrary location on the surface of the urine examination container 1.

Other Modification Examples

Hereinabove, preferable embodiments of the present invention have been described above, but the present invention is not limited to these embodiments. Within a range not departing from the gist of the present invention, addition, omission, substitution, and other changes of the configuration are possible. The present invention is not limited by the above description, but only by the appended claims.

As a modification example, in the bottom portion 2 of the urine examination container 1, the sides extending in the second direction and the sides extending in the third direction may have the same length. In this case, the bottom portion 2 has a substantially square shape.

The display portion 20 may be printed on the urine examination container 1, or may be attached to a predetermined location with a seal or the like after the urine examination container 1 is integrally molded.

The peripheral wall portion 3 may have a polygonal outer shape in a plan view. According to the present configuration, since the outer shape in a plan view is polygonal, urine can easily flow from the corners.

In addition, the inner surface of the corner portion forming the polygon, of the peripheral wall portion 3, may have a rib extending in the vertical direction. In a case where the urine examination container 1 is integrally formed by press processing, the rib is formed by folding an excess portion of the base material at a corner portion of the peripheral wall portion 3. According to the present configuration, it is possible to flatten the urine examination container 1 by expanding the ribs formed at the corners. Since the flattened urine examination container 1 can be rolled into a tubular shape, the volume at the time of discarding is reduced. The flattened urine examination container 1 is easily rolled into a cylindrical shape starting from the outer peripheral edge 6 on one side.

In addition, in a case where the urine examination container 1 is installed on the urine absorption surface of the urine absorption sheet, the urine examination container 1 flattened on a urine absorption surface of the urine absorption sheet is rolled into a tubular shape together with the urine absorption sheet and is discarded. According to this configuration, the urine collected in the urine examination container 1 can be absorbed by the urine absorption sheet and discarded, which is sanitary and reduces the volume of the urine examination container 1 for discarding. Therefore, the discarding cost can be reduced.

In the peripheral wall portion 3, a corner portion forming a polygon may have a bent portion (not shown) projecting in a V shape. The bent portion may be formed so as to project on an outer side of the peripheral wall portion 3, and may have a shape that serves as a spout for the collected urine. Specifically, the bent portion may have a V-shape with a bent tip projecting on an outer side from the corner. The bent portion may be formed at least at the upper edge of the corner portion of the peripheral wall portion 3, and may be formed over the inner surface of the corner portion. One bent portion may be formed for each corner. According to this configuration, the urine collected in the urine examination container 1 can be poured from the tip of the bent portion to an intended location, and thus the collected urine can be recovered or discarded without spilling, and the scattering of the urine can be suppressed.

<Urine Examination Kit>

The above-described urine examination container 1 may be packaged together with a test paper and provided as a urine examination kit. The test paper is preferably a test paper corresponding to the urine examination evaluation reference shown on the display portion 20 of the urine examination container 1.

The packaging is sufficient if the urine examination container 1 is not deformed, and is preferably packed in a housing container such as a paper box and a plastic container. It is preferable that the urine examination kit is packed in a box formed of high-weight paper, and the urine examination container 1 is not crushed or deformed. The high-weight paper is preferably a paper of 310 weight or more.

The urine examination kit preferably further includes a urine collection container. The urine collection container is preferably a container that can hygienically store a certain amount of urine as in the above-described embodiment.

In addition, it is possible to appropriately replace constituent elements in the above-described embodiments with known constituent elements within a range not departing from the spirit of the present invention, and the above-described modification example may be appropriately combined.

INDUSTRIAL AVAILABILITY

According to the urine examination container of the aspect, it is possible to provide a urine examination container and a urine examination kit that can easily collect urine for urine examination, can be used hygienically, and further, can collect urine without imposing stress on both the owner and the pet.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the related description, and is only limited by the scope of the appended claims.

EXPLANATION OF REFERENCES

1 Urine examination container
2 Bottom portion
3 Peripheral wall portion

4 Grip portion
5 Urine receiving portion
6 Outer peripheral edge
7 Outer peripheral portion
8 Groove portion
9 Inner wall portion
20 Display portion
21 Upper surface of bottom portion
21a Crystal confirmation region
21b Color confirmation region
θ Angle between bottom portion and peripheral wall portion

What is claimed is:

1. A urine examination container used for animal toilet including an upper container in which a plurality of holes is formed, and a tray for receiving and storing urine that drops from the holes of the upper container, the container comprising:
   a bottom portion, at least a part of an upper surface of which is black;
   a peripheral wall portion that extends upward from an outer peripheral edge of the bottom portion, surrounds a periphery of the bottom portion, and defines a urine receiving portion that opens upward together with the bottom portion; and
   a grip portion that projects outward from the peripheral wall portion,
   wherein an angle between the bottom portion and the peripheral wall portion is formed as an obtuse angle.

2. The urine examination container according to claim 1, wherein a groove portion is formed on an upper surface of the bottom portion.

3. The urine examination container according to claim 2, wherein the groove portion is formed in an outer peripheral portion of the upper surface of the bottom portion.

4. The urine examination container according to claim 2, wherein a plurality of the groove portions is formed on the upper surface of the bottom portion.

5. The urine examination container according to claim 1, wherein at least a part of an outer peripheral portion of the upper surface of the bottom portion is black.

6. The urine examination container according to claim 1, further comprising:
   a display portion indicating a urine examination evaluation reference on a surface of the urine examination container.

7. The urine examination container according to claim 1, wherein at least any one of the bottom portion, the peripheral wall portion, and the grip portion includes a display portion indicating a urine examination evaluation reference on a surface facing upward.

8. The urine examination container according to claim 7, wherein the display portion is provided on the surface facing upward of the grip portion or the peripheral wall portion.

9. The urine examination container according to claim 1, wherein the grip portion projects from the peripheral wall portion by 3 mm or more.

10. The urine examination container according to claim 1, wherein the grip portion extends downward as it goes outward.

11. A urine examination kit comprising:
    the urine examination container according to claim 1; and
    a test paper.

12. The urine examination kit according to claim 11, further comprising:
    a urine collection container.

* * * * *